US011562356B2

(12) United States Patent
Gerber et al.

(10) Patent No.: US 11,562,356 B2
(45) Date of Patent: Jan. 24, 2023

(54) SYSTEMS AND METHODS FOR COMMUNICATING LIABILITY ACCEPTANCE WITH PAYMENT CARD TRANSACTIONS

(71) Applicant: Mastercard International Incorporated, Purchase, NY (US)

(72) Inventors: Theunis J. Gerber, Wildwood, MO (US); Peter J. Groarke, Dublin (IE); Mark B. Wiesman, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/694,608

(22) Filed: Nov. 25, 2019

(65) Prior Publication Data
US 2020/0090173 A1 Mar. 19, 2020

Related U.S. Application Data

(63) Continuation of application No. 14/272,018, filed on May 7, 2014, now Pat. No. 10,521,791.

(51) Int. Cl.
*G06Q 20/40* (2012.01)
*G06Q 20/34* (2012.01)
*G06Q 20/42* (2012.01)

(52) U.S. Cl.
CPC ............ *G06Q 20/40* (2013.01); *G06Q 20/34* (2013.01); *G06Q 20/42* (2013.01)

(58) Field of Classification Search
None
See application file for complete search history.

(56) References Cited

U.S. PATENT DOCUMENTS

| | | | | |
|---|---|---|---|---|
| 5,659,616 A | * | 8/1997 | Sudia | G06Q 20/341 705/76 |
| 5,949,044 A | * | 9/1999 | Walker | G07F 7/0866 235/379 |

(Continued)

FOREIGN PATENT DOCUMENTS

| WO | 9821675 A1 | 5/1998 |
|---|---|---|
| WO | 0048053 A2 | 8/2000 |

(Continued)

OTHER PUBLICATIONS

PCT International Search Report and Written Opinion, Application No. PCT/US2017/058424, dated Jan. 2, 2018, 13 pps.

*Primary Examiner* — William J Jacob
(74) *Attorney, Agent, or Firm* — Armstrong Teasdale LLP

(57) ABSTRACT

A computer-based method for communicating liability acceptance for payment card transactions is provided. The method uses a computer device including a processor and a memory. The method includes receiving, by the processor, a transaction authorization request message for a payment card transaction having a default-liable party. The transaction authorization request message includes a shifted-liability acceptance indicator identifying a different party to the transaction that accepts liability for the payment card transaction. The method also includes authorizing the payment card transaction based at least in part on the shifted-liability acceptance indicator. The shifted-liability acceptance indicator changes the liability for the payment card transaction from the default-liable party to the different party accepting liability.

15 Claims, 8 Drawing Sheets

(56) References Cited

U.S. PATENT DOCUMENTS

| | | | |
|---|---|---|---|
| 6,999,943 B1 | 2/2006 | Johnson et al. | |
| 7,849,014 B2 | 12/2010 | Erikson | |
| 8,086,493 B2 | 12/2011 | Erikson | |
| 8,195,517 B2 | 6/2012 | Erikson | |
| 8,676,708 B1 * | 3/2014 | Honey | G06Q 40/02 705/44 |
| 8,756,151 B1 * | 6/2014 | Lubling | G06Q 40/02 705/38 |
| 8,763,916 B1 * | 7/2014 | Foo | G06K 7/087 235/492 |
| 2002/0022966 A1 * | 2/2002 | Horgan | G06Q 20/342 705/35 |
| 2005/0102234 A1 * | 5/2005 | Devine | G06Q 20/40 705/44 |
| 2010/0205078 A1 * | 8/2010 | Lawrence | G06Q 20/32 705/34 |
| 2011/0016513 A1 | 1/2011 | Bailey, Jr. | |
| 2011/0071892 A1 * | 3/2011 | Dickelman | G06Q 30/0238 705/14.17 |
| 2011/0191252 A1 * | 8/2011 | Dai | G06Q 20/322 705/71 |
| 2011/0238510 A1 * | 9/2011 | Rowen | G06K 9/3283 705/16 |
| 2012/0221472 A1 | 8/2012 | Erikson | |
| 2013/0144785 A1 | 6/2013 | Karpenko et al. | |
| 2013/0218765 A1 | 8/2013 | Hammad et al. | |
| 2013/0226706 A1 * | 8/2013 | Haggerty | G06Q 30/02 705/14.66 |
| 2014/0164254 A1 * | 6/2014 | Dimmick | G06Q 20/36 705/71 |
| 2015/0149336 A1 * | 5/2015 | Haggerty | G06Q 20/354 705/35 |
| 2015/0213433 A1 * | 7/2015 | Khan | H04L 9/0844 705/71 |
| 2015/0235209 A1 | 8/2015 | Murphy et al. | |
| 2015/0324795 A1 | 11/2015 | Gerber et al. | |
| 2017/0103399 A1 * | 4/2017 | Napsky | G06Q 20/3226 |

FOREIGN PATENT DOCUMENTS

| | | |
|---|---|---|
| WO | 0055777 A1 | 9/2000 |
| WO | 02089076 A2 | 11/2002 |
| WO | 2013082190 A1 | 6/2013 |

* cited by examiner

SYSTEMS AND METHODS FOR COMMUNICATING LIABILITY ACCEPTANCE WITH PAYMENT CARD TRANSACTIONS

CROSS REFERENCE TO RELATED APPLICATIONS

This application is a continuation of U.S. patent application Ser. No. 14/272,018 filed on May 7, 2014, entitled "SYSTEMS AND METHODS FOR COMMUNICATING LIABILITY ACCEPTANCE WITH PAYMENT CARD TRANSACTIONS", which is hereby incorporated by reference in its entirety.

BACKGROUND OF THE DISCLOSURE

This disclosure relates generally to online payment transactions and, more specifically, to systems and methods for enabling one or more parties to an online transaction to accept liability for a payment card transaction.

Conventional payment card transaction systems enable a cardholder to purchase goods or services from a merchant with their payment card, such as a debit card or a credit card. At a time of sale, the cardholder presents their payment card information to the merchant for use to complete the purchase. A process of payment authorization is conducted before the purchase is completed. The merchant transmits the payment card information and other transaction data, such as a total payment amount, to a payment card network. The payment card network analyzes the transaction and forwards the transaction to an issuing bank (i.e., the creditor behind the cardholder's payment card). The issuing bank receives the transaction and either authorizes or declines the transaction.

Each party to the transaction (i.e., merchants, merchant acquirers, payment network, and issuing bank) has a role to play in the authorization process. Each party may allow or decline the authorization based on their respective roles, as well as their potential exposures. Conventional payment card transaction systems frequently have a default set of rules governing liability for the transaction when a transaction is disputed (e.g., who will be responsible when the cardholder does not pay). Each party may accept or decline a transaction based on their own individual authorization strategies. For example, one party may implement tighter fraud screening and scoring to help manage against potential fraud exposure (e.g., in card-not-present transactions). This may result in a declined transaction, a result that may not be favorable to other parties to the transaction.

BRIEF DESCRIPTION OF THE DISCLOSURE

In one aspect, a computer-based method for communicating liability acceptance for payment card transactions is provided. The method uses a computer device including a processor and a memory. The method includes receiving, by the processor, a transaction authorization request message for a payment card transaction having a default-liable party. The transaction authorization request message includes a shifted-liability acceptance indicator identifying a different party to the transaction that accepts liability for the payment card transaction. The method also includes authorizing the payment card transaction based at least in part on the shifted-liability acceptance indicator. The shifted-liability acceptance indicator changes the liability for the payment card transaction from the default-liable party to the different party accepting liability.

In another aspect, a computing device for processing payment card transactions is provided. The computing device includes a processor communicatively coupled to a memory. The computing device is programmed to receive a transaction authorization request message for a payment card transaction having a default-liable party. The transaction authorization request message includes a shifted-liability acceptance indicator identifying a different party to the transaction that accepts liability for the payment card transaction. The computing device is also programmed to authorize the payment card transaction based at least in part on the shifted-liability acceptance indicator. The shifted-liability acceptance indicator changes the liability for the payment card transaction from the default-liable party to the different party accepting liability.

In yet another aspect, at least one non-transitory computer-readable storage media having computer-executable instructions embodied thereon is provided. When executed by at least one processor, the computer-executable instructions cause the processor to receive a transaction authorization request message for a payment card transaction having a default-liable party. The transaction authorization request message includes a shifted-liability acceptance indicator identifying a different party to the transaction that accepts liability for the payment card transaction. The computer-executable instructions also cause the processor to store, in the memory, a record of the party's liability for the payment card transaction. The computer-executable instructions further cause the processor to authorize the payment card transaction based at least in part on the shifted-liability acceptance indicator. The shifted-liability acceptance indicator changes the liability for the payment card transaction from the default-liable party to the different party accepting liability.

BRIEF DESCRIPTION OF THE DRAWINGS

FIG. 1 is a schematic diagram illustrating an example multi-party payment card industry system for enabling ordinary payment-by-card transactions in which merchants and card issuers do not necessarily have a one-to-one relationship.

FIG. 2 is a simplified block diagram of an example payment processing system for processing enhanced authorization request messages having shifted-liability acceptance indicators.

FIG. 3 is an expanded block diagram of an example embodiment of a server architecture of the transaction processing system shown in FIG. 2 including the plurality of computer devices in accordance with one example embodiment of the present disclosure.

FIG. 4 illustrates an example configuration of a client system shown in FIGS. 2 and 3.

FIG. 5 illustrates an example configuration of a server system shown in FIGS. 2 and 3.

FIG. 6 is an example payment transaction environment including the payment processing system shown in FIG. 3 in which a party to a payment card transaction may accept liability for the transaction through a shifted-liability acceptance indicator.

FIG. 7 is an example method for communicating liability acceptance with payment card transactions in the payment network environment shown in FIG. 6.

FIG. 8 shows an example configuration of a database within a computing device, along with other related computing components, that may be used for communicating liability acceptance with payment card transactions.

DETAILED DESCRIPTION OF THE DISCLOSURE

Figure 1:
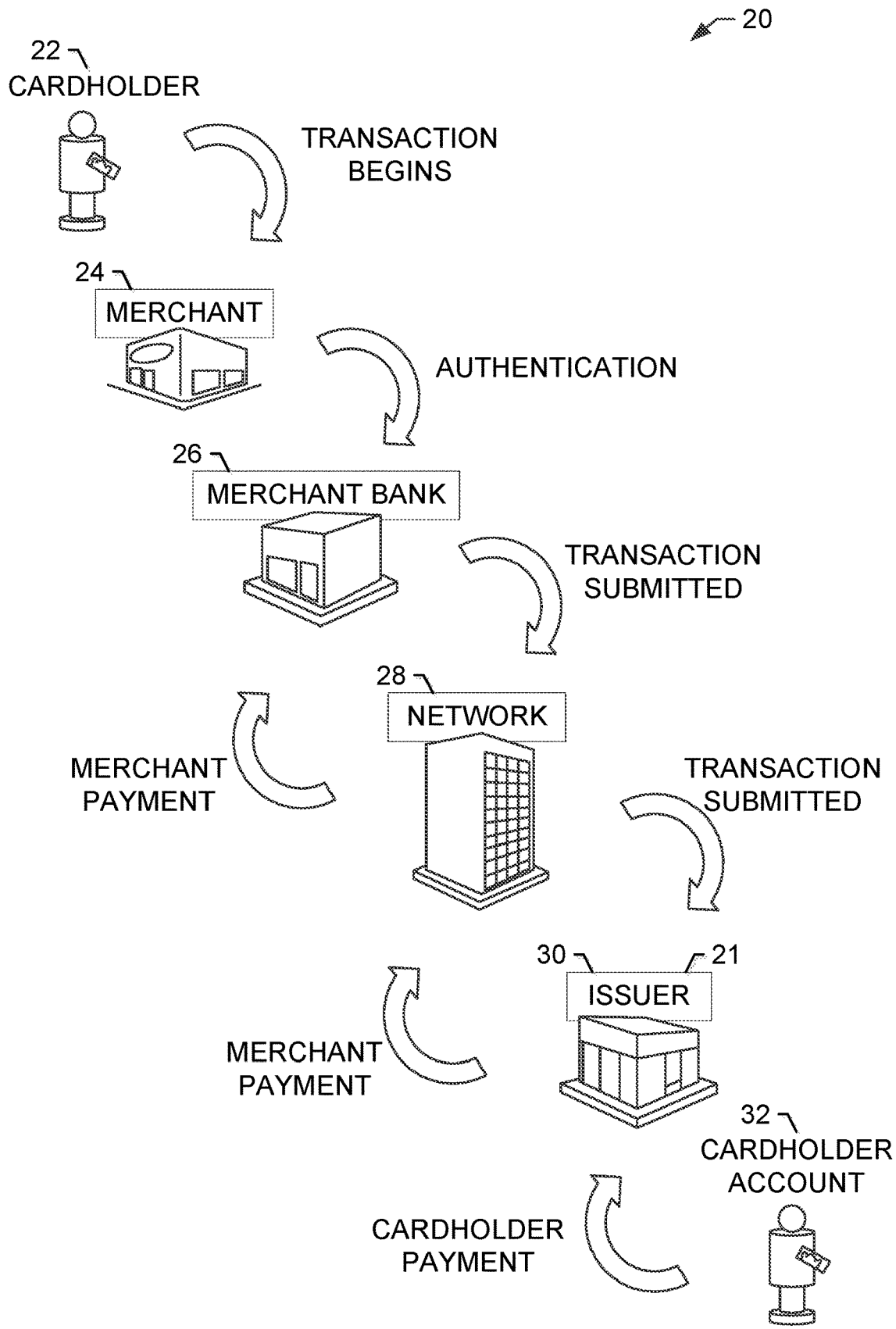
FIGS. 1-8 show example embodiments of the methods and systems described herein.

Systems and methods are described herein for communicating liability acceptance for payment card transactions. More specifically, the systems and methods described herein enable a party to a payment card transaction (e.g., a merchant) to override the default liability for the transaction and, instead, assume liability for the transaction itself (i.e., shift liability to itself). For example, a merchant may recognize a loyal customer during a transaction. When the loyal customer presents his payment card to complete a purchase, the transaction authorization request may be declined based on factors such as, for example, an insufficient authentication of the cardholder. However, because the merchant recognizes the loyal customer and can personally authenticate him, the merchant may be willing to accept liability for the transaction rather than have the loyal customer be denied.

In some embodiments, as a part of the transaction, the merchant may be presented with a decline through, for example, a point of sale (POS) device, as well as a reason for the decline. The system provides a mechanism for the merchant to accept liability for the otherwise-declined transaction. In one embodiment, the merchant selecting a liability override function through the POS device. When the merchant executes the liability override function, the POS device transmits another transaction authorization request message to the payment network that includes the liability override on behalf of the merchant. In other words, the transaction authorization request includes an indication that the merchant is willing to accept liability for the transaction on a predetermined condition (e.g., the merchant is willing to accept liability for customer authentication). Accordingly, the system processes and records the liability assignment to the overriding party (e.g., the merchant) for that predetermined condition in case of later disputes, and the transaction is authorized even if it otherwise would be declined based on that predetermined condition.

A technical effect of the systems and processes described herein include at least one of: (a) receiving a transaction authorization request message for a payment card transaction having a default-liable party, the transaction authorization request message including a shifted-liability acceptance indicator identifying a different party to the transaction that accepts liability for the payment card transaction; (b) authorizing the payment card transaction based at least in part on the shifted-liability acceptance indicator, wherein the shifted-liability acceptance indicator changes the liability for the payment card transaction from the default-liable party to the different party accepting liability; (c) receiving an initial transaction authorization request message for the payment card transaction; (d) rejecting the initial transaction authorization request message based on a rejection condition; (e) providing the rejection condition in an initial response message prior to receiving the transaction authorization request message, wherein the transaction authorization request message is a second transaction authorization request message for the payment card transaction; (f) transmitting the liability acceptance indicator to an issuing bank of the payment card transaction, wherein the issuing bank authorizes the payment card transaction based at least in part on the liability acceptance indicator; (g) receiving the transaction authorization request message from a point-of-sale device associated with a merchant, wherein the merchant indicates acceptance of liability through the point-of-sale device; and (h) storing, in the memory, a record of the party's liability for the payment card transaction.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party transaction card industry system 20 for authorizing payment card transactions and, more specifically, for enabling one or more parties to a payment card transaction to accept liability for one or more aspects of authorization. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, savings information, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

In some embodiments, a default set of rules may define the liabilities of the various parties (i.e., merchant 24, merchant bank 26, interchange network 28, and issuer bank 30) for disputed transactions based on characteristics of the transaction (e.g., transaction environment, merchant category and type of card/cardholder verification obtained by the merchant). For example, issuing bank 30 may have default liability in card-present transactions, but merchant 24 may have default liability in card-not-present transactions. If, however, merchant 24 utilizes an authentication service offered by network 28, then liability for card-not-present transactions may shift to issuing bank 30. As used herein, the term "default rules" or "default set of rules" is used generally to refer to the rules governing the attachment of liability in the various scenarios based on various characteristics of the transaction, but before or without the use of the liability-shifting aspects of this disclosure (e.g., through use of the shifted-liability acceptance indicator as described herein). Further, the term "default-liable party" is used generally to refer to the party that would be liable if not overridden by the liability-shifting aspects of this disclosure, where the term "overriding party" is the party that assumes liability for a transaction using the liability-shifting aspects of this disclosure (e.g., thereby supplanting the default-liable party).

As described above, the various parties to the payment card transaction include one or more of the parties shown in FIG. 1 such as, for example, cardholder 22, merchant 24, merchant bank 26, interchange network 28 (also referred to herein as payment processor 28), issuer bank 30, and/or an issuer processor 21.

Figure 2:
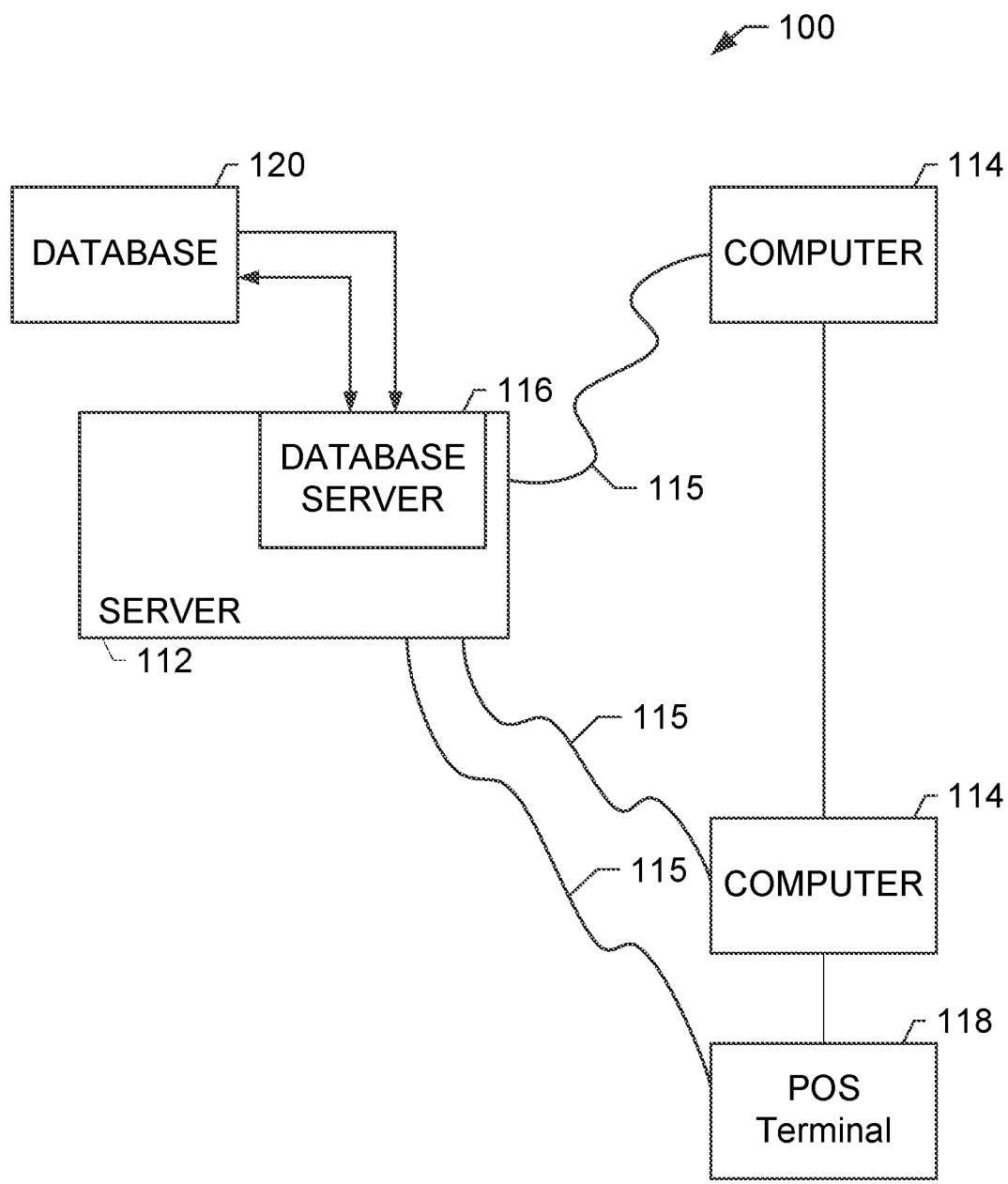

FIG. 2 is a simplified block diagram of an example payment processing system 100 for processing enhanced authorization request messages having shifted-liability acceptance indicators (also referred to herein as liability acceptance indicators). System 100 includes a plurality of computer devices connected in communication in accordance with the present disclosure. In the example embodiment, system 100 may be used for overriding liability during authorization of payment card transactions in the interchange environment shown in FIG. 1.

More specifically, in the example embodiment, system 100 includes a server system 112 in communication with a point-of-sale (POS) terminal 118 at a merchant location, such as merchant 24 (shown in FIG. 1), and/or other client systems 114 associated with merchants, merchant banks, payment networks, and/or issuer banks. The POS terminal 118 or other client systems 114 may be used by a party to a payment card transaction to accept liability for the transaction, as described herein.

In the example embodiment, server system 112 is also in communication with a plurality of client sub-systems, also referred to as client systems 114. In one embodiment, client systems 114 are computers including a web browser, such that server system 112 is accessible to client systems 114 using the Internet. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 could be any device capable of interconnecting to the Internet including a web-based phone, PDA, or other web-based connectable equipment.

In the example embodiment, system 100 also includes POS terminals 118, which may be connected to client systems 114 and may be connected to server system 112. POS terminals 118 may be interconnected to the Internet (or any other network that allows the POS terminals 118 to communicate as described herein) through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a cardholder's financial transaction card. In some embodiments, POS terminal 118 may be a cardholder's personal computer, such as when conducting an online purchase through the Internet. As used herein, the terms POS device, POS terminal, and point of interaction device are used broadly, generally, and interchangeably to refer to any device in which a cardholder interacts with a merchant to complete a payment card transaction.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities and savings activities conducted over the processing network including data relating to merchants, account holders or customers, issuers, acquirers, savings amounts, savings account information, and/or purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may also store liability acceptance information associated with parties to the transaction, such as merchants, merchant banks, payment networks, and/or issuer banks. Further, database 120 may also store rules for default liability and/or liability acceptance indicators for particular transactions.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with interchange network 28 or a payment processor. In the example embodiment, server system 112 is associated with a network interchange, such as interchange network 28, and may be referred to as an interchange computer system or a payment processing computing device. Server system 112 may be used for processing transaction data. In addition, client systems 114 and/or POS terminal 118 may include a computer system associated with at least one of an online bank, a bill payment outsourcer, an acquirer bank, an acquirer processor, an issuer bank associated with a transaction card, an issuer processor, a remote payment system, a token requestor, a token provider, and/or a biller.

Figure 3:
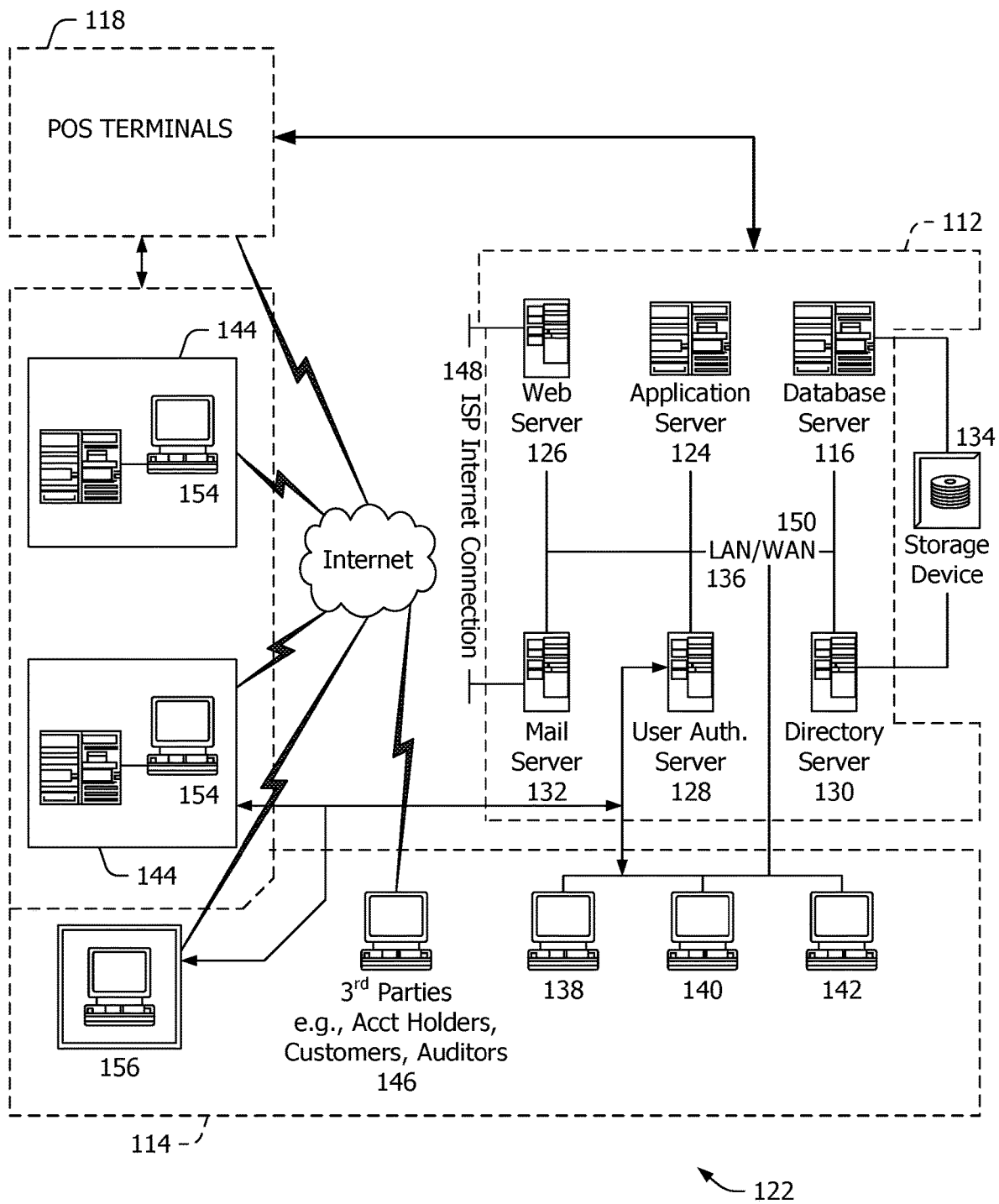

FIG. 3 is an expanded block diagram of an example embodiment of a server architecture of a transaction processing system 122 including other computer devices in accordance with one embodiment of the present disclosure. Components in system 122, identical to components of system 100 (shown in FIG. 2), are identified in FIG. 3 using the same reference numerals as used in FIG. 2. Transaction processing system 122 includes server system 112, client systems 114, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network connection 115. Workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, cardholders (i.e., consumers), merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
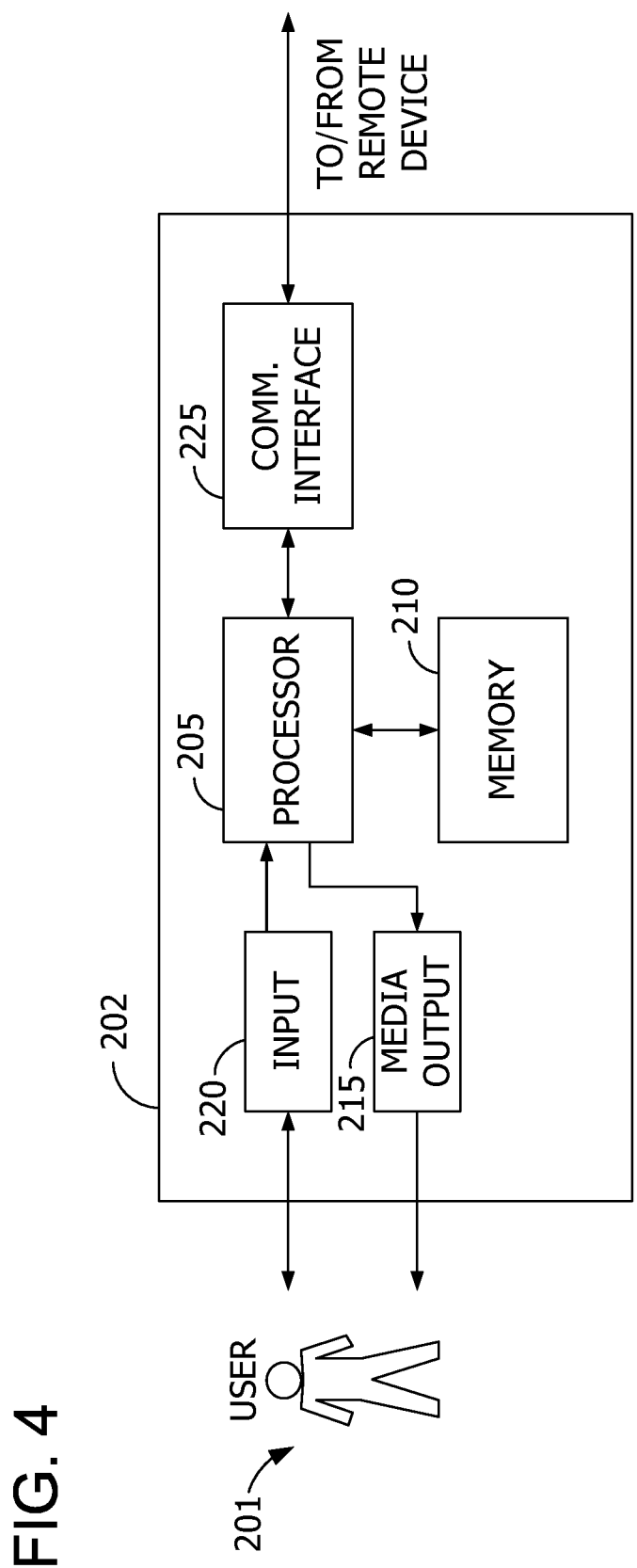

FIG. 4 illustrates an example configuration of a user system 202 operated by a user 201, such as cardholder 22 (shown in FIG. 1). User system 202 may include, but is not limited to, client systems 114, 138, 140, and 142, POS terminal 118, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
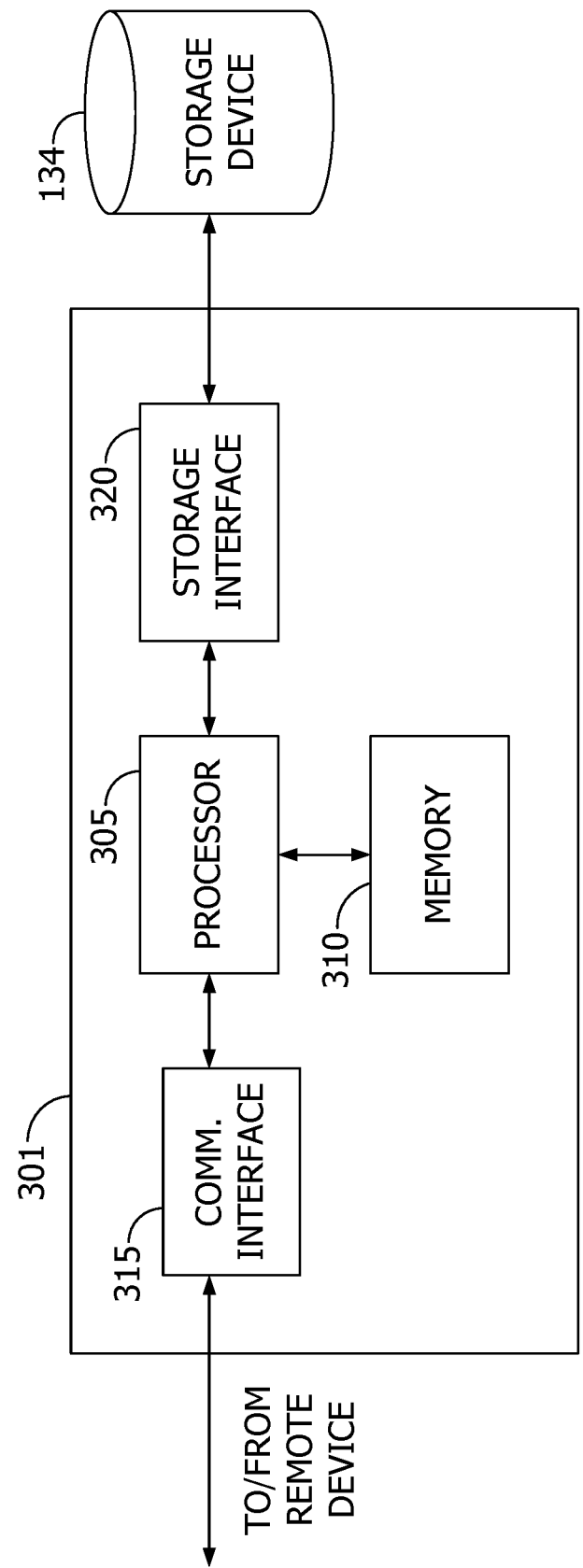

FIG. 5 illustrates an example configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
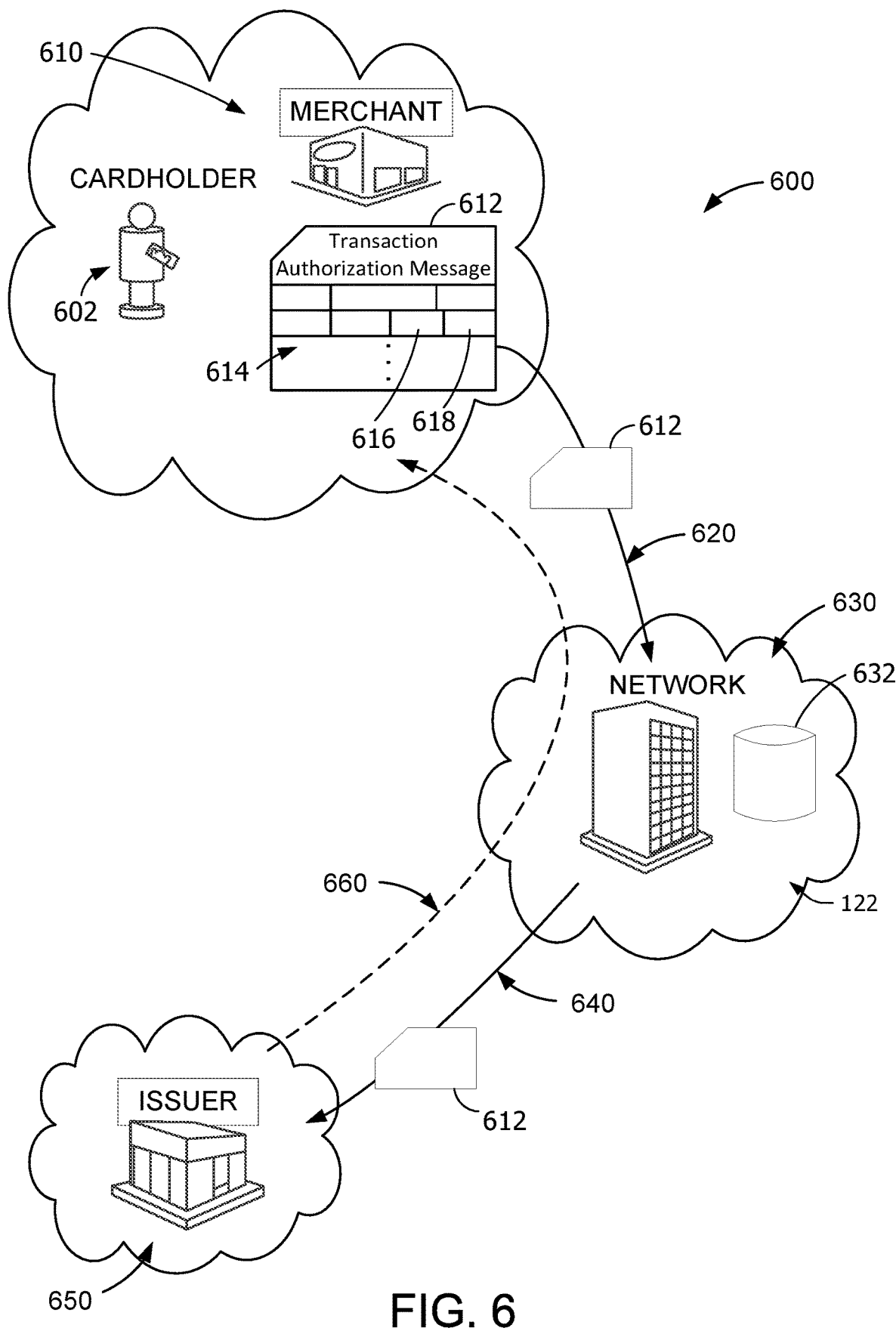

FIG. 6 is an example payment transaction environment 600 including payment processing system 122 (shown in FIG. 3) in which a party to a payment card transaction may accept liability for the transaction through a liability acceptance indicator 616. In the example embodiment, a cardholder 602 engages in a payment card transaction with a merchant 610 for goods or services. In some embodiments, the transaction environment may be at merchant's 610 store location, and may include interaction with a point-of-sale (POS) device such as POS terminal 118 (shown in FIGS. 2 and 3). In other embodiments, the transaction environment may be an Internet transaction, such as through merchant's 610 web site.

In the example embodiment, the POS terminal 118 generates a transaction authorization message 612 (also referred to herein as "request message", "transaction authorization request message", and/or "response message") as a part of the payment card transaction. Transaction authorization message 612 generally represents a request by cardholder 602 and merchant 610 to complete a payment transaction with cardholder's 602 payment card. Transaction authorization message 612 includes a plurality of data fields 614 that include typical data necessary to authorize cardholder's 602 use of their payment card, such as, for example, one or more of the following: a primary account number associated with the payment card, a transaction amount, a merchant identifier, an acquirer identifier, a merchant category, a transaction date/time, a transaction environment, and/or a card or cardholder verification.

Further, transaction authorization message 612 includes one or more additional fields related to liability acceptance. In the example embodiment, transaction authorization message 612 includes liability acceptance indicator 616, which in some embodiments is a data field, such as a party identifier, that is used to identify the party that overrides default liability rules (i.e., the "overriding party") and accepts liability for the transaction. The uses of liability acceptance indicator 616 are described in greater detail below.

During normal processing of a payment card transaction, and similar to the illustration and description of FIG. 1, transaction authorization message 612 is transferred and processed by other parties to the transaction. In the example embodiment, transaction authorization message 612 is transferred 620 from merchant 610 to merchant bank 26 (shown in FIG. 1, not separately shown in FIG. 6) and a payment network 630, and subsequently transferred to an issuer 650. An authorization response 660 is transferred back through to merchant 610, indicating at least a status of the authorization request. Each party to the authorization of the payment card transaction performs one or more authorization steps as is known in the art, such as, for example, verification of the merchant, verification of a status of the payment card, verification of available funds or credit associated with the payment card, and routing of the transaction to another party, just to name a few.

Further, each party to the transaction may refuse to authorize the payment transaction during their respective authorization steps for transaction authorization message 612. In other words, each party may have a set of rules for acceptance of payment card transactions. For example, some issuing banks may want to be more stringent with transaction authorizations up front, and thus may implement a tighter fraud scoring mechanism, while other issuing banks may be less stringent on fraud scoring and instead deal with problems after the fact through other mechanisms. In general, if a transaction successfully passes the authorization steps of a particular party, then that party authorizes the transaction from their perspective and passes the transaction to the next party. If a transaction fails the authorization steps, then that party declines the transaction. Such authorization steps may be different for each party based on, for example, their respective roles and default liabilities to authorization of payment transactions. As such, each party to the transaction may store and process local authorization steps for determining compliance with one or more acceptance conditions.

Each rejection of the transaction defines a "condition" under which the transaction was rejected, referred to herein as a "rejection condition." For example, rejection conditions may include declining (e.g., authorization denial by the issuing bank), invalid card number (e.g., bad data), lost or stolen card, insufficient funds (e.g., consumer is beyond their credit limit), and expired card. In the example embodiment, rejection conditions are represented by a set of rejection codes, wherein each code maps to a type of rejection. In some embodiments, each type of rejection correlates to one or more authorization steps performed by one or more parties to the transaction. As such, the set of rejection codes may be analyzed along with the rejection condition for a declined transaction to determine rejection information such as: who rejected the transaction (the "rejecting party"), for what reason the transaction was rejected (e.g., a "rejection explanation"), and/or what authorization step failed (e.g., an authorization step identifier). In some embodiments, other data fields and/or data structures are used to define the rejection condition, such as, for example, additional data fields including any of the above rejection information.

In the example embodiment, payment transaction environment 600 includes a default set of liability rules ("default rules") that generally govern what parties to the transaction are responsible for what aspects of authorization (i.e., which authorization steps), as well as which party or parties are responsible for certain disputes. In some embodiments, the party that is responsible for a particular authorization step is also the party that bears default liability in the event of a dispute that implicates a failure in that authorization step. In some embodiments, default rules are represented as a pair of values such as [<authorization step>, <liable party>], where <authorization step> represents the authorization step that may be implicated during a dispute, and where <liable party> represents the default party that is liable for such a dispute (e.g., the default-liable party). For example, the default-liable party may be the party to a transaction that would be liable for a particular rejection condition under the default rules. In other words, a default-liable party is liable for a dispute arising from a particular authorization step unless an overriding party has otherwise accepted liability, such as through use of the liability acceptance indicator as described herein.

During operation, in the example embodiment, transaction authorization message 612 is rejected by a downstream party to the transaction, and subsequently overridden by an upstream party to the transaction. As used herein, the terms "downstream party" and "upstream party" are used generally to refer to the parties involved in the transaction, as well as the parties' processing relationships with each other with regard to transaction authorization message 612 as it traverses from cardholder 602 and merchant 610 down to issuer 650. In other words, transaction authorization message 612 flows downstream from cardholder 602 and merchant 610 to merchant bank 26, to network 630, and then to issuer 650. This relationship makes cardholder 602 and merchant 610 the most "upstream" parties, and issuer 650 the most "downstream" party.

Further, as used herein, the term "rejecting party" is used generally to refer to the party that rejects transaction authorization message 612, and the term "overriding party" is used generally to refer to the party that overrides the default liability rules that likely prompted the rejecting party to reject transaction authorization message 612. Based on this relationship between parties to the payment transaction authorization process, an upstream party (i.e., the overriding party) may override a rejection of transaction authorization message 612 by a downstream party (i.e., the rejecting party).

For example, in the example embodiment, the payment card transaction is initiated from merchant 610 and transferred 620 as transaction authorization message 612 to network 630. During this first exchange, liability acceptance indicator 616 is excluded (i.e., the data field is not present in message 612). In other embodiments, liability acceptance indicator 616 is present in message 612, but indicates that the default liability rules are in place (i.e., there is no overriding party yet in place).

Continuing the example, system 122 receives, processes, and rejects transaction authorization message 612 (thereby becoming the rejecting party) and sends a responsive transfer 660 back to merchant 610. In some embodiments, responsive transfer 660 indicates one or more of which party is the rejecting party (e.g., a party identifier) and a rejection condition (e.g., a condition code indicating a rejection type). In the example embodiment, POS terminal 118 presents an indication of the rejection, as well as a description of the rejection. Merchant 610 uses POS terminal 118 to override the rejection (thereby becoming the overriding party). POS terminal 118 populates liability acceptance indicator 616 with an overriding party identifier indicating merchant 610 as the overriding party. In some embodiments, the overriding party identifier is one or more of a consumer identifier, a merchant identifier, an acquirer identifier, a payment processor identifier, or an issuer identifier. POS terminal 118 transfers 620 transaction authorization message 612 back to network 630 for additional processing.

Subsequently, one or more downstream parties examines liability acceptance indicator 616 and allows transaction authorization message 612 to continue processing. In the example, the original rejecting party (e.g., system 122 of network 630) analyzes liability acceptance indicator 616, recognizes that merchant 610 has accepted liability for this transaction, and continues processing (e.g., skips the rejection of) transaction authorization message 612. Accordingly, liability shifts from the default liability of [<authorization step>, default-liable party] to [<authorization step>, merchant]. As such, a transaction that otherwise may have been declined will subsequently be accepted, with a shift in liability as to which party bears responsibility in the event of a dispute.

In some embodiments, the overriding party may include an indication of liability acceptance in the first transfer of transaction authorization message 612. In other words, a party to the transaction may preemptively include an indication of liability acceptance prior to a rejection of the transaction (referred to herein as "preemptive liability acceptance"). For example, merchant 610 may recognize cardholder 602 as a regular, loyal customer at the time of the initial transaction. As such, merchant 610 may accept liability for the transaction upon entering the initial transaction, thereby avoiding a potential rejection and resubmission. As such, some transactions that would have been rejected may skip a rejection cycle as described above. Further, in some embodiments, preemptive liability acceptance only preempts the default liability rule if the transaction would otherwise have been declined, where in other embodiments, preemptive liability acceptance preempts the default liability rule regardless of whether the transaction would otherwise have been declined.

In other embodiments, a rejection need not return back to the cardholder 602 and merchant 610. For example, another downstream party, such as network 630, may pass a transaction through to issuer 650 who rejects the transaction. However, when network 630 receives the indication of rejection, network 630 may decide to accept liability and re-submit the transaction with an indication of network's 630 acceptance of liability back to issuer 650. Accordingly, liability acceptance indicator 616 and/or additional rejection identifiers 618 may be injected into messages 612 at any stage of the transaction authorization process. As such, upstream parties such as merchant bank 26, merchant 610, and cardholder 602 may be unaware of the original rejection and/or the shift in liability for the transaction.

In still other embodiments, transaction authorization message 612 may also include rejection conditions 618 indicating one or more particular rejections to which liability acceptance indicator 616 applies. In other words, liability acceptance indicator 616 may only apply to certain types of rejections, or rejections by certain parties. As such, liability acceptance indicator 616 coupled with rejection identifiers 618 serves to accept partial liability (e.g., liability for certain rejection conditions or events, such as for fraud-related conditions but not for financial related conditions) by the overriding party. In some embodiments, rejection conditions 618 are derived from the rejection. For example, if network 630 rejected for a rejection condition X, then merchant 610 may be willing to accept liability for X, but not for another rejection condition Y. As such, a subsequent transmission with rejection condition 618 indicating only condition X and facing only a rejection for condition X will be authorized. However, a subsequent transmission with rejection condition 618 indicating only reason X but later facing a rejection for rejection condition Y will ultimately result in a rejection.

Further, in some embodiments, one or more parties may skip one or more authentication steps based on the presence of liability acceptance indicator 616 and/or rejection conditions 618. For example, if merchant 610 has accepted liability for a rejection type associated with lack of credit, issuer 610 may skip processing a check for available credit, since the issuer will not reject the transaction based on this condition even if the consumer has insufficient available credit.

Additionally, in the example embodiment, network 630 stores a record of the overriding party's acceptance of liability for the transaction in a database 632. Network 630 or other parties to the transaction may later use database 632 to determine who has liability for the transaction, such as during a dispute. In some embodiments, the authorization message contains the liability acceptance indicator that indicates the party accepting liability for the transaction. This authorization message, or a separate record of the liability acceptance, is stored in database 632 for later use. For example, a chargeback transaction (e.g., a dispute) may be linked to a prior presentment through, for example, an acquirer reference number. In a two-phase purchase system (e.g., authorization and subsequent presentment), a presentment is linked to a prior authorization message through a number of transaction fields such as, for example, a primary account number (PAN) and authorization code, or a PAN and a reference number.

While the example embodiment shown in FIG. 6 illustrates transaction authorization message 612 as a single message with a format of data fields 614 as described above, it should be understood that the exact structure of transaction authorization message 612 may differ (e.g., be altered by the parties) based on the stage of processing (e.g., at transfers 620 and 640) so long as they enable the systems and methods described herein. Further, it should be understood that responsive messages transferred 660 back through to merchant 610 may also differ in structure so long as they enable the systems and methods described herein.

Figure 7:
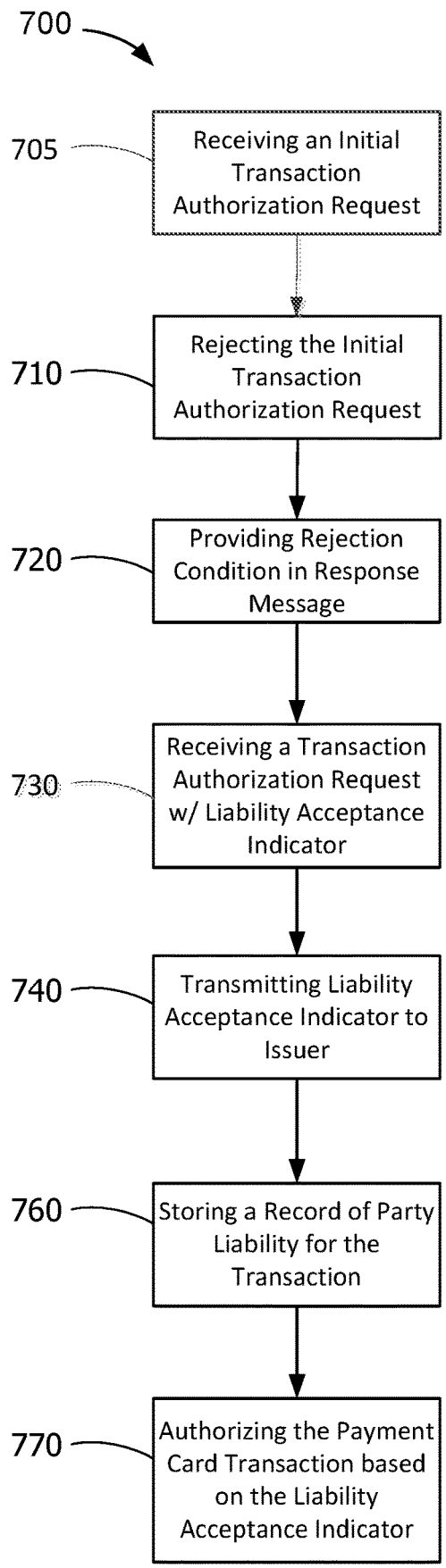
Figure 7:
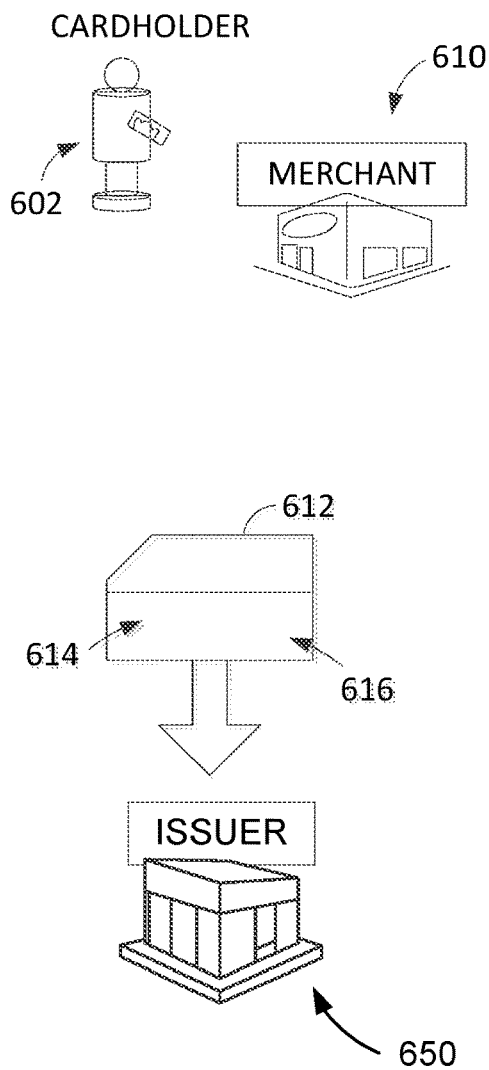

FIG. 7 is an example method 700 for communicating liability acceptance for payment card transactions in an interchange environment 600 such as shown in FIG. 6. In the example embodiment, method 700 is performed by a computing system such as server 112 (shown in FIG. 2), transaction processing system 122 (shown in FIGS. 3 and 6), or by computing device 810 (shown in FIG. 8). In some embodiments, method 700 includes receiving 705 an initial transaction authorization request message for the payment card transaction, rejecting 710 the initial transaction authorization request based on a rejection condition, and providing 720 the rejection condition in a response message prior to receiving the transaction authorization request message, wherein the transaction authorization request message is a second transaction authorization request message for the payment card transaction. The rejection and/or rejection condition may be provided by any party involved in accepting the payment card transaction, such as issuer 650 or network 630 (shown in FIG. 6).

In the example embodiment, method 700 includes receiving 730 a transaction authorization request message 612 for a payment card transaction having a default-liable party. The transaction authorization request message 612 includes a shifted-liability acceptance indicator 616 identifying a different party to the transaction that accepts liability for the payment card transaction (also referred to herein as an overriding party). In some embodiments, the liability acceptance indicator 616 identifies an overriding party for the payment card transaction including one of merchant, acquirer, cardholder, issuer, and payment network, the overriding party accepting liability for the payment card transaction. In some embodiments, the party accepting liability for the payment card transaction is different than the default-liable party as determined based on a set of default liability rules. Further, in some embodiments, the shifted-liability acceptance indicator 616 and/or the transaction authorization request message 612 further includes the rejection condition. In other embodiments, receiving 730 the transaction authorization request message includes receiving the transaction authorization request message from a point-of-sale device associated with a merchant, enabling the merchant to indicate acceptance of liability through the point-of-sale device.

Further, in some embodiments, method 700 includes transmitting 740 the liability acceptance indicator to an issuing bank of the payment card transaction, and the issuing bank authorizes the payment card transaction based at least in part on the liability acceptance indicator. In the example embodiment, method 700 includes authorizing 770 the payment card transaction based at least in part on the shifted-liability acceptance indicator 616. The shifted-liability acceptance indicator changes the liability for the payment card transaction from the default-liable party to the different (e.g., overriding) party that is accepting liability for the transaction. In some embodiments, authorizing the payment card transaction is further based at least in part on the rejection condition. In still other embodiments, method 700 further includes storing 760 a record of the party's liability for the payment card transaction.

Figure 8:
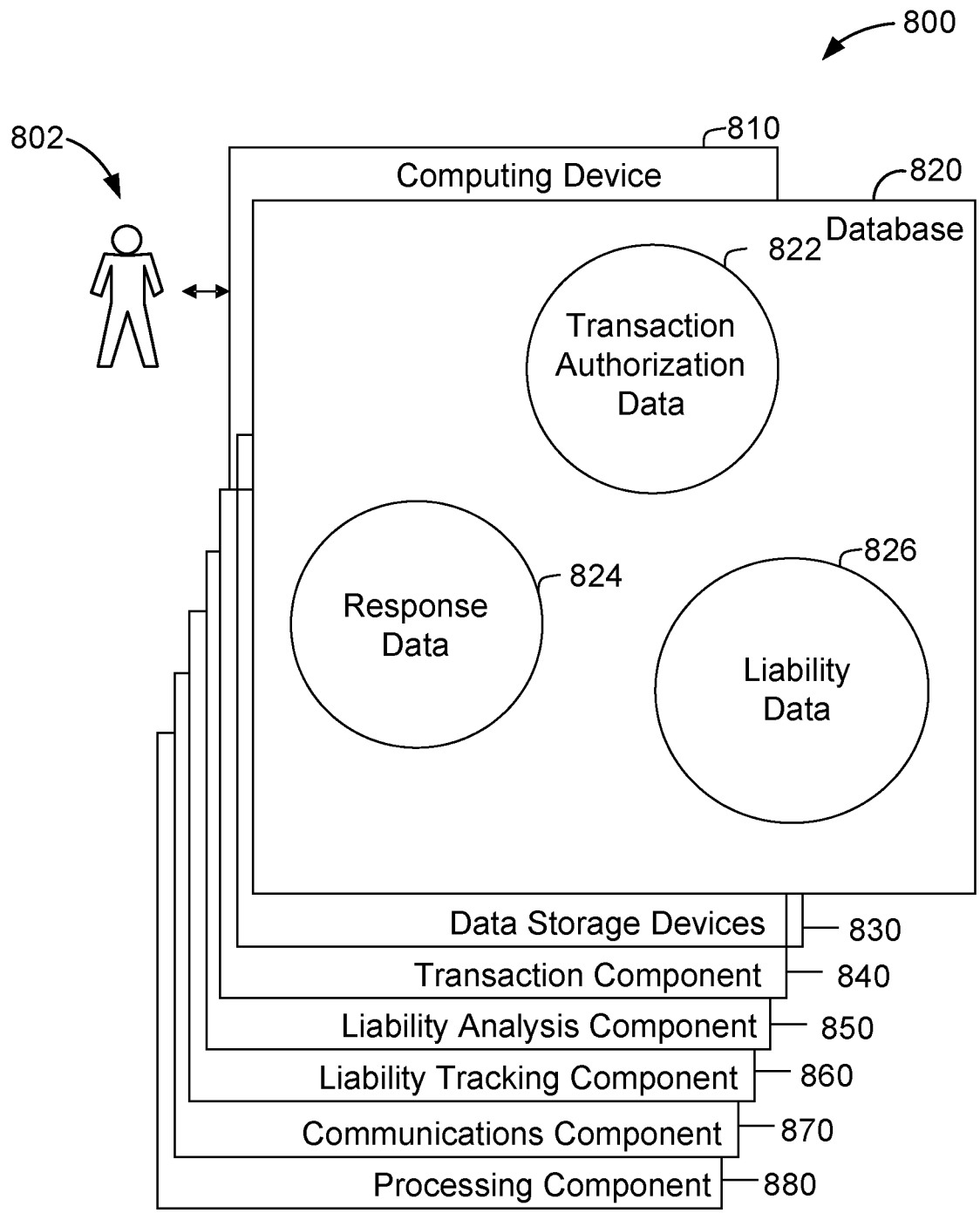

FIG. 8 shows an example configuration 800 of a database 820 within a computing device 810, along with other related computing components, that may be used to process and/or communicate liability acceptance for payment card transactions. In some embodiments, computing device 810 is similar to server system 112 (shown in FIG. 2), transaction processing system 122 (shown in FIGS. 3 and 6), and/or server system 301 (shown in FIG. 5). Database 820 is coupled to several separate components within computing device 810, which perform specific tasks.

In the example embodiment, database 820 includes transaction authorization data 822, response data 824, and liability data 826. In some embodiments, database 820 is similar to database 120 (shown in FIG. 2). Transaction authorization data 822 includes information associated with payment transactions, such as described in reference to FIG. 6. Response data 824 includes information associated with responses to payment authorization requests, such as described in reference to FIG. 6. Liability data 826 includes data associated with liabilities for payment card transactions such as discussed in reference to FIG. 6.

Computing device 810 includes the database 820, as well as data storage devices 830. Computing device 810 also includes a transaction component 840 for analyzing transaction authorization data 822, as described in reference to FIGS. 1 and 6. Computing device 810 also includes a liability analysis component 850 for analyzing liability of payment card transactions, including liability acceptance indicators 616 and/or rejection identifiers 618. A liability tracking component 860 is also included for storing liability data 826 for future use during transaction disputes. A communications component 870 is also included for communicating transaction authorization data 822 and/or response data 824 with merchants, merchant banks, point-of-sale devices, and/or issuing banks. A processing component 880 assists with execution of computer-executable instructions associated with the system.

As will be appreciated based on the foregoing specification, the above-described embodiments of the disclosure may be implemented using computer programming or engineering techniques including computer software, firmware, hardware or any combination or subset thereof, wherein the technical effect is a flexible system for communicating liability acceptance for payment card transactions. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for communicating liability acceptance for payment card transactions involving a default-liable party, the method using a computer device including a processor and a memory, said method comprising:
   storing, in a database, i) default liability rules that list a plurality of stages of an authorization process and, for each of the stages, a respective default-liable party, and ii) liability acceptance rules that enable an override of the default liability rules in response to specified content of a shifted-liability acceptance indicator data field in an authorization request message;
   in response to transmitting a first authorization request message to an issuer computing device, receiving, by the processor from the issuer computing device associated with an issuer, a first authorization response message including a primary account number (PAN) associated with a payment card transaction initiated by a cardholder of the PAN at a merchant, the first authorization response message being a stage of the plurality of stages, the first authorization response message temporarily declining the payment card transaction, wherein the issuer is associated with the PAN and represents the default-liable party for the payment card transaction under the default liability rules for the stage;
   communicating, by the processor, the temporary declining of the payment card transaction to a point-of-sale (POS) computing device associated with the payment card transaction, wherein the communication causes the POS computing device to present a description of the temporary decline and a selectable liability override function;
   receiving, by the processor from the POS computing device in response to a selection of the selectable liability override function, a second authorization request message including the PAN and associated with the payment card transaction, the second authorization request message including the shifted-liability acceptance indicator data field populated with a party identifier identifying the merchant;
   in response to receiving the party identifier as the content of the shifted-liability acceptance indicator data field, overriding the default liability rules with the liability acceptance rules by designating the merchant as liable at the stage of the authorization process;
   in response to designating the merchant as liable at the stage, transmitting, by the processor to the issuer computing device, the second authorization request message including the shifted-liability acceptance indicator data field, wherein the shifted-liability acceptance indicator data field acknowledges the overriding of the default liability rules; and
   authorizing, by the processor after receiving approval of the second authorization request message from the issuer computing device, the payment card transaction based at least in part on the shifted-liability acceptance indicator data field.

2. The method of claim 1 further comprising receiving, by the processor, the first authorization request message from the POS computing device.

3. The method of claim 1 further comprising:
   analyzing, by the processor, the second authorization request message including identifying the shifted-liability acceptance indicator data field; and
   identifying, by the processor, shifted-liability acceptance indicator data field within the second authorization request message.

4. The method of claim 1, wherein designating the merchant as liable at the stage comprises:
   updating, by the processor, a stored liability record by storing the party identifier, wherein the party identifier indicates an intent by the merchant to assume liability for the payment card transaction overriding the default liability rules.

5. The method of claim 1 further comprising:
   rejecting, by the processor, the first authorization request message based on a rejection condition; and
   providing the rejection condition in an initial response message prior to receiving the second authorization request message for the payment card transaction.

6. A computing device for processing payment card transactions involving a default-liable party, said computing device comprising a processor communicatively coupled to a memory, said computing device programmed to:
   store, in a database, i) default liability rules that list a plurality of stages of an authorization process and, for each of the stages, a respective default-liable party, and ii) liability acceptance rules that enable an override of the default liability rules in response to specified content of a shifted-liability acceptance indicator data field in an authorization request message;
   in response to transmitting a first authorization request message to an issuer computing device, receive, from the issuer computing device associated with an issuer, a first authorization response message including a primary account number (PAN) associated with a payment card transaction initiated by a cardholder of the PAN at a merchant, the first authorization response message being a stage of the plurality of stages, the first authorization response message temporarily declining the payment card transaction, wherein the issuer is associated with the PAN and represents the default-liable party for the payment card transaction under the default liability rules for the stage;

communicate the temporary declining of the payment card transaction to a point-of-sale (POS) computing device associated with the payment card transaction, wherein the communication causes the POS computing device to present a description of the temporary decline and a selectable liability override function;

receive, from the POS computing device in response to a selection of the selectable liability override function, a second authorization request message including the PAN and associated with the payment card transaction, the second authorization request message including the shifted-liability acceptance indicator data field populated with a party identifier identifying the merchant;

in response to receiving the party identifier as the content of the shifted-liability acceptance indicator data field, overriding the default liability rules with the liability acceptance rules by designating the merchant as liable at the stage of the authorization process;

in response to designating the merchant as liable at the stage, transmit, to the issuer computing device, the second authorization request message including the shifted-liability acceptance indicator data field, wherein the shifted-liability acceptance indicator data field acknowledges the overriding of the default liability rules; and authorize, after receiving approval of the second authorization request message from the issuer computing device, the payment card transaction based at least in part on the shifted-liability acceptance indicator data field.

7. The computer device of claim 6 further programmed to receive the first authorization request message from the POS computing device.

8. The computer device of claim 6 further programmed to:
analyze the second authorization request message including identifying the shifted-liability acceptance indicator data field; and
identify shifted-liability acceptance indicator data field within the second authorization request message.

9. The computer device of claim 6 further programmed to designate the merchant as liable at the stage by:
updating a stored liability record by storing the party identifier, wherein the party identifier indicates an intent by the merchant to assume liability for the payment card transaction overriding the default liability rules.

10. The computer device of claim 6 further programmed to:
reject the first authorization request message based on a rejection condition; and
provide the rejection condition in an initial response message prior to receiving the second authorization request message for the payment card transaction.

11. A non-transitory computer-readable storage medium having computer-executable instructions embodied thereon, wherein when executed by at least one processor communicatively coupled to a memory, the computer-executable instructions cause the processor to:
store, in a database, i) default liability rules that list a plurality of stages of an authorization process and, for each of the stages, a respective default-liable party, and ii) liability acceptance rules that enable an override of the default liability rules in response to specified content of a shifted-liability acceptance indicator data field in an authorization request message;

in response to transmitting a first authorization request message to an issuer computing device, receive, from the issuer computing device associated with an issuer, a first authorization response message including a primary account number (PAN) associated with a payment card transaction initiated by a cardholder of the PAN at a merchant, the first authorization response message being a stage of the plurality of stages, the first authorization response message temporarily declining the payment card transaction, wherein the issuer is associated with the PAN and represents a default-liable party for the payment card transaction under the default liability rules for the stage;

communicate the temporary declining of the payment card transaction to a point-of-sale (POS) computing device associated with the payment card transaction, wherein the communication causes the POS computing device to present a description of the temporary decline and a selectable liability override function;

receive, from the POS computing device in response to a selection of the selectable liability override function, a second authorization request message including the PAN and associated with the payment card transaction, the second authorization request message including the shifted-liability acceptance indicator data field populated with a party identifier identifying the merchant;

in response to receiving the party identifier as the content of the shifted-liability acceptance indicator data field, overriding the default liability rules with the liability acceptance rules by designating the merchant as liable at the stage of the authorization process;

in response to designating the merchant as liable at the stage, transmit, to the issuer computing device, the second authorization request message including the shifted-liability acceptance indicator data field, wherein the shifted-liability acceptance indicator data field acknowledges the overriding of the default liability rules; and authorize, after receiving approval of the second authorization request message from the issuer computing device, the payment card transaction based at least in part on the shifted-liability acceptance indicator data field.

12. The computer-readable storage medium of claim 11, wherein the computer-executable instructions further cause the processor to receive the first authorization request message from the POS computing device.

13. The computer-readable storage medium of claim 11, wherein the computer-executable instructions further cause the processor to:
analyze the second authorization request message including identifying the shifted-liability acceptance indicator data field; and
identify shifted-liability acceptance indicator data field within the second authorization request message.

14. The computer-readable storage medium of claim 11, wherein the computer-executable instructions further cause the processor to designate the merchant as liable at the stage by:
updating a stored liability record by storing the party identifier, wherein the party identifier indicates an intent by the merchant to assume liability for the payment card transaction overriding the default liability rules.

15. The computer-readable storage medium of claim 11, wherein the computer-executable instructions further cause the processor to:
  reject the first authorization request message based on a rejection condition; and
  provide the rejection condition in an initial response message prior to receiving the second authorization request message for the payment card transaction.

* * * * *